US009529924B2

(12) United States Patent
Grant et al.

(10) Patent No.: US 9,529,924 B2
(45) Date of Patent: Dec. 27, 2016

(54) USER INTERFACE PROVIDING LOCALIZED SEARCH CAPABILITIES

(75) Inventors: Scott A. Grant, Sunnyvale, CA (US); David A. Carson, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 282 days.

(21) Appl. No.: 13/563,027

(22) Filed: Jul. 31, 2012

(65) Prior Publication Data
US 2014/0040224 A1 Feb. 6, 2014

(51) Int. Cl.
G06Q 30/02 (2012.01)
G06F 17/30 (2006.01)

(52) U.S. Cl.
CPC ....... *G06F 17/3087* (2013.01); *G06Q 30/0256* (2013.01)

(58) Field of Classification Search
CPC .................................................. G06Q 30/0256
USPC ....................................................... 707/706
See application file for complete search history.

(56) References Cited

U.S. PATENT DOCUMENTS

| | | | |
|---|---|---|---|
| 8,126,885 B2* | 2/2012 | Prasad et al. | 707/727 |
| 2004/0078224 A1* | 4/2004 | Schramm-Apple et al. | 705/2 |
| 2005/0283464 A1* | 12/2005 | Allsup et al. | 707/3 |
| 2010/0306022 A1* | 12/2010 | Plut | 705/10 |
| 2010/0306191 A1 | 12/2010 | LeBeau et al. | |
| 2012/0054167 A1* | 3/2012 | Chi et al. | 707/706 |
| 2012/0284247 A1* | 11/2012 | Jiang et al. | 707/706 |
| 2013/0166376 A1* | 6/2013 | Cohen et al. | 705/14.45 |

FOREIGN PATENT DOCUMENTS

| | | |
|---|---|---|
| CN | 104520847 A | 4/2015 |
| JP | 2003281173 A | 10/2003 |
| JP | 2004133873 A | 4/2004 |
| WO | WO-2010080328 A2 | 7/2010 |

OTHER PUBLICATIONS

Schwartz, Barry; "iPhone's Spotlight Search"; Published on Jun. 22, 2009; http://searchengineland.com/iphones-spotlight-search-21357.*
Parr, Benn; "Google Android Search Just Became Awesome"; Published on Oct. 9, 2009; http://mashable.com/2009/10/09/android-quick-search-box/.*
"International Application Serial No. PCT/US2013/052909, International Search Report mailed Jan. 14, 2014", 2 pgs.

(Continued)

*Primary Examiner* — Grace Park
(74) *Attorney, Agent, or Firm* — Schwegman Lundberg & Woessner, P.A.

(57) ABSTRACT

A user interface is disclosed that operates in conjunction with a search engine browser to present localized information that pertains to specific areas of interest. As characters of a search query are being entered into the browser, they are provided to one or more servers that are associated with respective domains of information. If information within those domains corresponds to the search query being entered, an indication is provided to the user of those results, in addition to any input provided by the search engine browser. The user interface enables the user to access the results, even before the search is conducted, to quickly learn about items from the domains that may be of possible interest.

44 Claims, 6 Drawing Sheets

(56) References Cited

OTHER PUBLICATIONS

"International Application Serial No. PCT/US2013/052909, Written Opinion mailed Jan. 14, 2014", 5 pgs.
"Spotlight (software)", Wikipedia®, the free encyclopedia. [online]. [retrieved on Jun. 19, 2012]. Retrieved from the Internet: <URL: https://web.archive.org/web/20120619205318/ https://en.wikipedia.org/wiki/Spotlight_(software)> (last modified Jun. 14, 2012), (2012), 11 pgs.
"Australian Application Serial No. 2013296541, First Examiner Report mailed Nov. 17, 2015", 4 pgs.
"Australian Application Serial No. 2013296541, Response filed Apr. 18, 2016 to First Examiner Report mailed Nov. 17, 2015", 25 pgs.
"Australian Application Serial No. 2013296541, Subsequent Examiners Report mailed Apr. 19, 2016", 4 pgs.
"European Application Serial No. 13748198.2, Office Action mailed Mar. 6, 2015", 2 pgs.
"European Application Serial No. 13748198.2, Response filed Sep. 15, 2015 to Office Action mailed Mar. 6, 2015", 6 pgs.
"International Application Serial No. PCT/US2013/052909, International Preliminary Report on Patentability mailed Feb. 12, 2015", 6 pgs.
"Japanese Application Serial No. 2015-525539, Amendment filed Jun. 22, 2015", 10 pgs.
"Japanese Application Serial No. 2015-525539, Office Action mailed May 20, 2016", W/ English Translation, 11 pgs.
"Korean Application Serial No. 10-2015-7005176, Notice of Preliminary Rejection mailed May 17, 2016", 10 pgs.
"Korean Application Serial No. 10-2015-7005176, Response filed Jul. 8, 2016 to Notice of Preliminary Rejection mailed May 17, 2016", with English translation of claims, 18 pgs.

\* cited by examiner

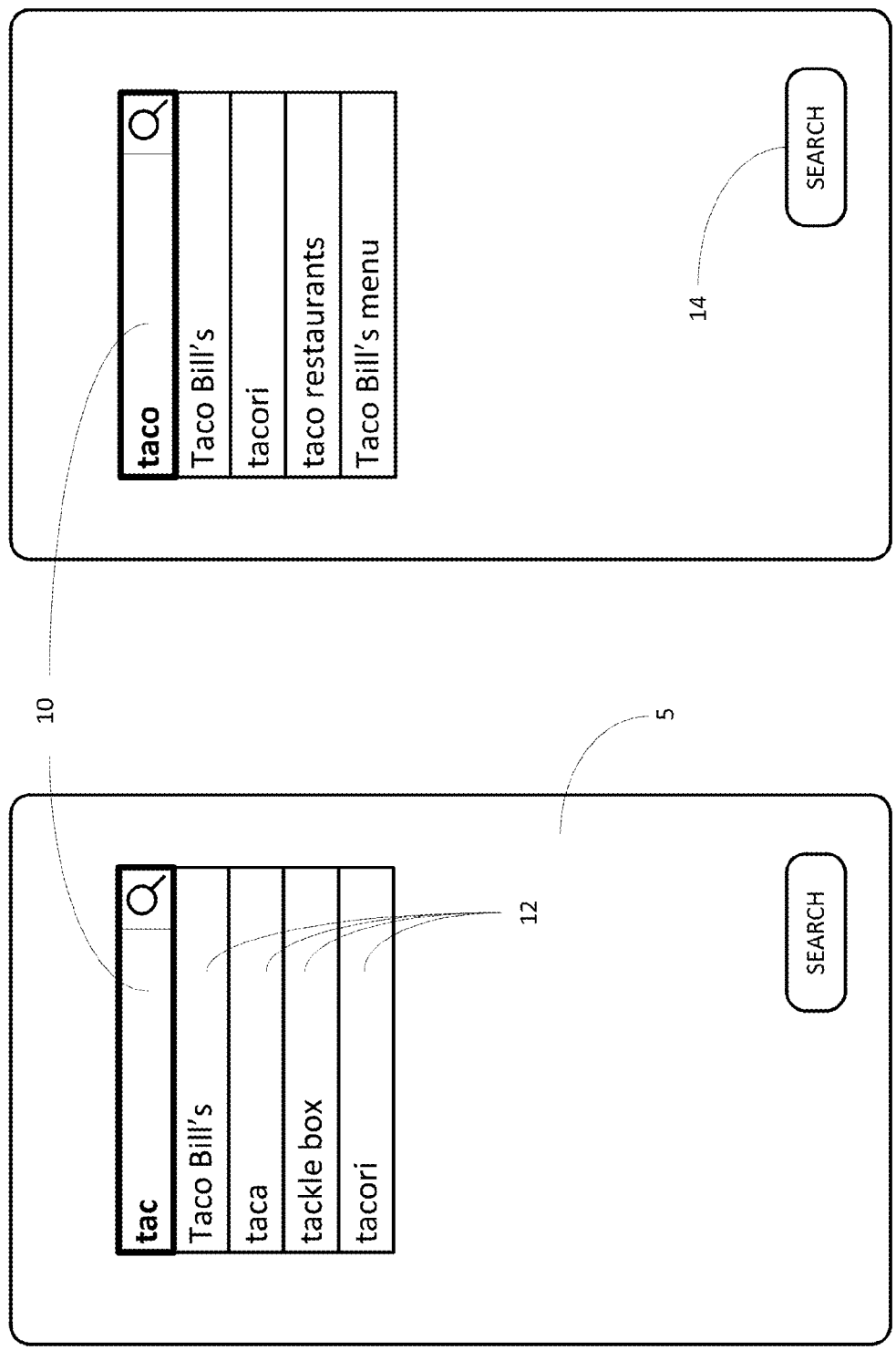

USER INTERFACE PROVIDING LOCALIZED SEARCH CAPABILITIES

FIELD OF THE INVENTION

The present disclosure is directed to information searches, for example searching for relevant resources on the Internet, and more particularly to a user interface that provides localized search results in addition to those provided by a conventional search engine.

BACKGROUND

The use of search engines to locate information has become a commonplace occurrence for users of personal computers and mobile devices, such as smart phones, tablet computers and the like. For example, popular search engines enable the users to locate practically any kind of information that is available via the Internet. Conventionally, a browser is used to access an Internet-based search engine, and once the user is connected to the site of the search engine, a query can be entered to locate information of interest. In response to the entry of the query, the search engine returns a listing of Internet websites, and/or resources accessible via the Internet, that are relevant to the search query.

In addition to Internet websites, other sources of information may be relevant to the user's query. For example, if the user is looking for an applet to use on a mobile device, rather than employing an Internet search engine, the user might launch a browser that is specifically associated with an online applet store. Within this browser, the user can enter information that is relevant to the type of applet being sought, e.g. "currency converter," and in response the browser returns a listing of all of the applets in the online store that are relevant to this topic. In this scenario, to find multiple types of information that are relevant to currency conversion, the user is required to perform multiple searches, namely one that looks for relevant websites on the Internet, and another that specifically searches applets in an online store. The first search is global in nature, in that it may be capable of searching all publicly available websites on the Internet, but does not provide non-website information. The second search is more localized in nature, since it is directed to the products in a specific applet store, and may return results that are more pertinent to the user's particular area of interest. A more desirable user experience could be provided if the user is able to obtain information from both of these sources via a single search.

SUMMARY

A user interface for a browser is disclosed that operates in conjunction with a search engine to present localized information that pertains to specific areas of interest. As characters of a search query are being entered into the browser, they are provided to one or more servers that are associated with respective domains of information. If information within those domains corresponds to the search query being entered, an indication is provided to the user of those results, in addition to any input provided by the search engine browser. The user interface enables the user to access the results, even before the search is conducted, to quickly learn about items from the domains that may be of possible interest.

Further features of the use interface, and the advantages provided thereby, are described hereinafter with reference to exemplary embodiments illustrated in the accompanying drawings.

BRIEF DESCRIPTION OF THE DRAWING FIGURES

FIGS. 1A and 1B are illustrations of an exemplary browser interface for the entry of a search query and the presentation of results from a search engine;

DETAILED DESCRIPTION

Figure 3:
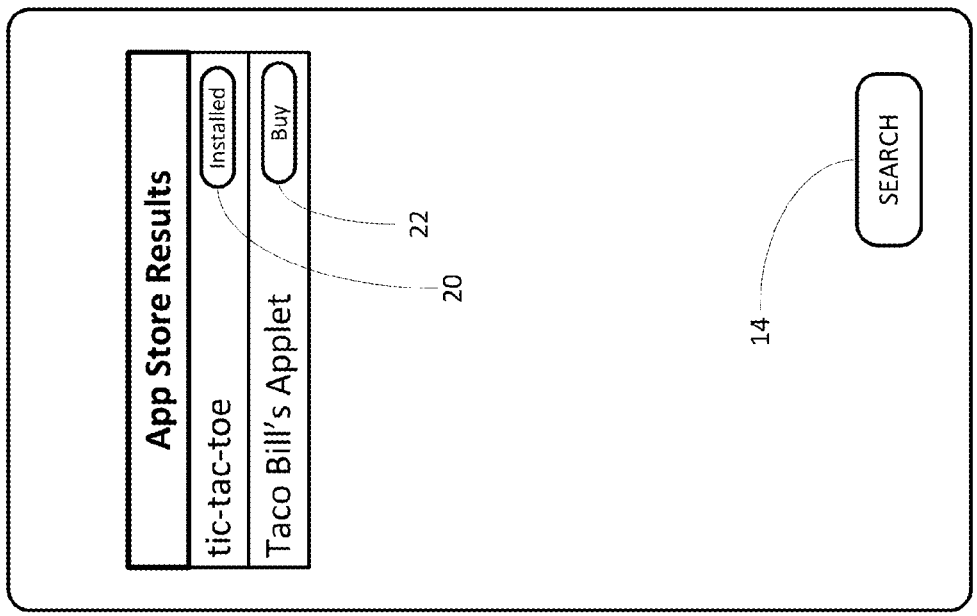
FIG. 3 is an illustration of a display that is shown in response to user selection of an item in the localized information menu.

Described hereinafter is a user interface for a browser, and associated functionality, that enhances the results obtained by an Internet search engine, or the like, by including information obtained from a more localized domain. In the context of this disclosure, the localized domain may include information that is resident on the computing device via which the user is conducting a search, but is not limited thereto. More specifically, the concept of a "localized" domain refers to a set of information that is managed by an entity that may be relevant to the user's computing experience. For example, the information may be managed by a server that is remote from the user, but accessible via the user's computing device when a search is conducted.

To facilitate an understanding of the concepts underlying the disclosed user interface, exemplary embodiments are described with reference to their implementation in a mobile device, such as a smart phone or tablet computer. It will be appreciated that the practical applications of the user interface are not limited to this particular application. Rather, the user interface can be implemented in any computing device in which it is conventional, or desirable, to perform searches for information that is available from a suitable source, such as Internet websites. Such a computing device includes a processor for executing computer program instructions that implement the functions described hereinafter, as well as a computer-readable memory, e.g., RAM, ROM, flash drive, magnetic or optical disk drive, etc., for storing the program instructions.

FIGS. 1A and 1B illustrate an example of a conventional interface for a browser that might appear on the display of a user device 5 when a user conducts an Internet search. In the example of FIG. 1A, the user has accessed the site of an Internet search engine, and entered the first three letters of a search query, "t-a-c," in a search entry field 10. In many popular Internet search engines, after the user has entered a minimum number of letters, the search engine may begin to display suggestions for completing the query, based upon popularly searched sites. In the illustrated example, below the field 10 for the entry of the search query, the search engine has provided a number of suggested phrases 12 that begin with those three letters. Referring to FIG. 1B, after the user has entered a fourth letter, in this case "o," the suggestions change, by eliminating the phrases that do not include that fourth letter, and adding additional phrases that more closely match the query being entered.

Once the query has been entered, the user can submit it to the search engine, for example by pressing a "Search" button 14 on the user interface. In response, the search engine displays a listing of all of the Internet websites that it has located in which the phase constituting the search query appears, or which are otherwise relevant to the query term. The listing may be prioritized in order of most popular sites, or some other suitable heuristic.

Figure 2:
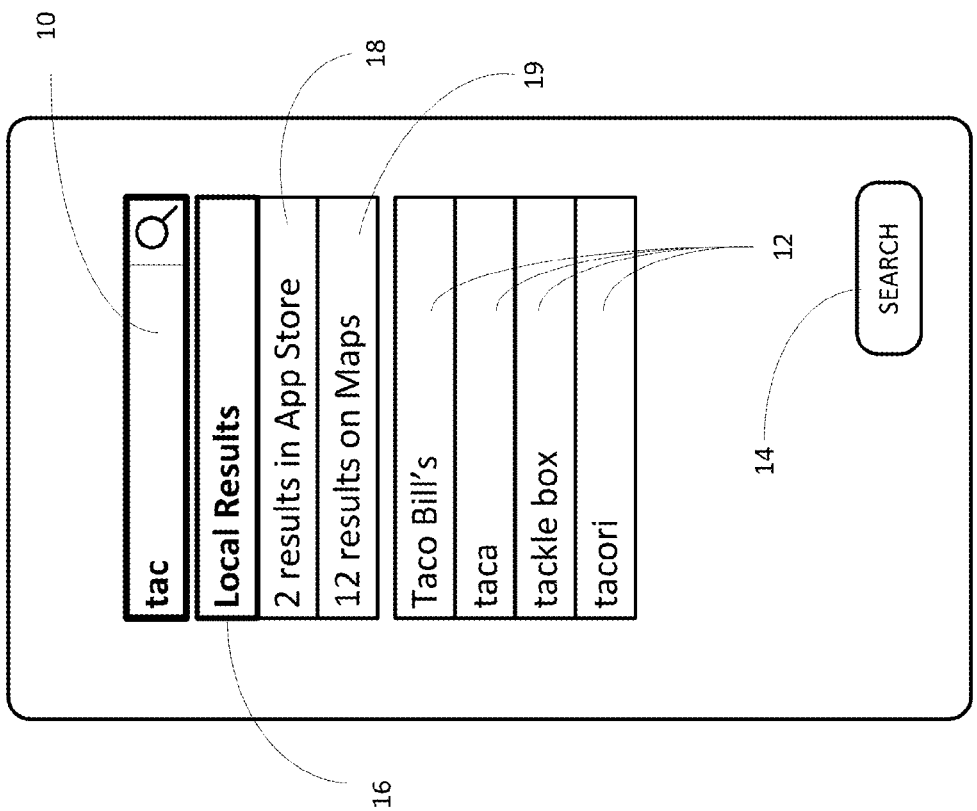
FIG. 2 is an illustration of a display showing the entry of a search query and the presentation of results in accordance with the user interface disclosed herein.

FIG. 2 illustrates a user interface that provides localized information, in addition to the results obtained via the Internet search engine. As in the conventional browser interface, a query field 10 provides a space for the user to enter search terms relating to the information being sought. Similarly, as the query is being entered, suggested terms for completing the search entry 12, received from the search engine, are displayed. Located between the search entry field and the list of suggested terms, a pop-up (or pop-over) menu 16 is displayed. This menu provides results that are retrieved with a localized search that is conducted in conjunction with the Internet-based search to be performed by the search engine. It will be appreciated that the localized information menu 16 can be located at other positions on the user interface, e.g., below the suggestions 12 or above the search entry field 10.

The localized information presented in the menu 16 is obtained independently of any data provided via the online search engine. In the particular example illustrated in FIG. 2, indications of two types of localized results are displayed. The menu 16 indicates that two matching results were located in an online applet store, and twelve results can be found in a map applet. These results are displayed in real time as the search query is being entered, and updated with each new character of the query. By clicking on either of the entries in the menu 16, the user can see the specific results. For instance, in one embodiment, if the user taps, or clicks, upon the line 18 indicating that two results were found in the applet store, a screen such as that shown in FIG. 3 can appear, e.g., by sliding over the browser interface. One result is an applet for a "tic-tac-toe" game, and the other result is an applet for a chain of taco restaurants. As an alternative to displaying a listing of the specific results, as depicted in FIG. 3, tapping on the applet store results indication 18 shown in FIG. 2 could automatically launch an applet for the online applet store that is resident on the user's device. In that case, the display would switch to the normal interface for the online applet store, and may show the two applets that were identified in response to the query being entered.

If any of the identified applets in the online store results is already resident on the user's device, a suitable indication 20 that the applet is installed can be provided. By clicking on this indicator, the installed applet could be launched. If any of the identified applets is not installed, a button 22 indicating that the applet is available for purchase can be pressed. By doing so, the applet for the online store can be launched, to enable the user to view information about the identified applet, and purchase it if desired. As a third possibility, the user may have already purchased the applet, but it is not installed on the device, e.g., it was installed on a different one of the user's devices. In this case, the button 20 or 22 might offer the user the option to install the applet on the current device.

Conversely, if the user desires to see the results that were identified in connection with the map applet, tapping or clicking upon the corresponding menu item 19 in the display of FIG. 2 can cause the map applet to be automatically launched and to display the locations of the identified items, e.g. local taco restaurants.

Figure 4:
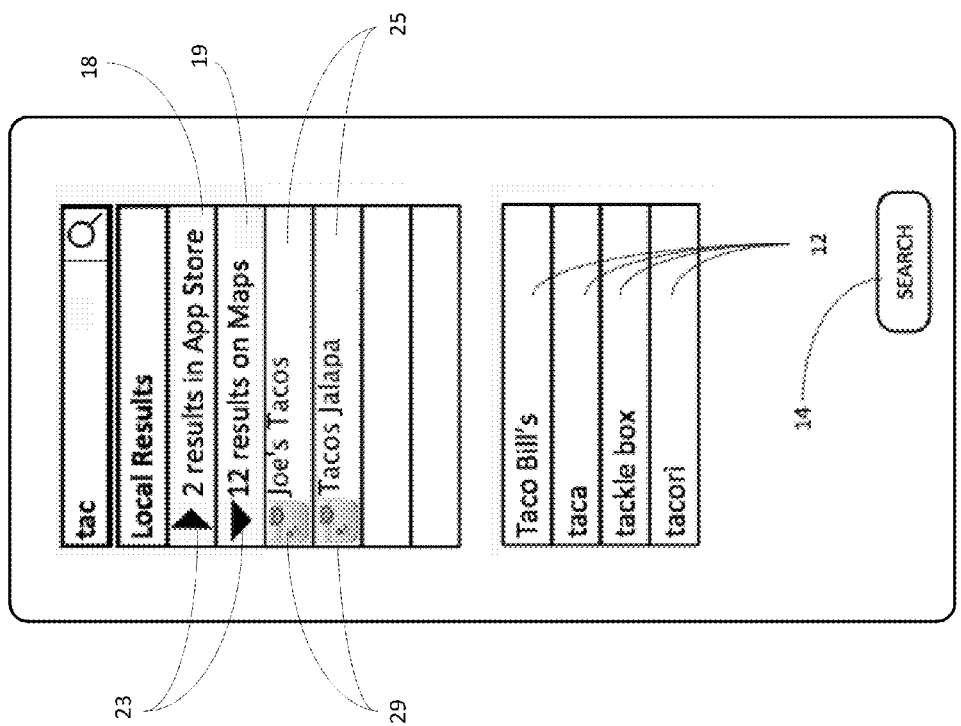
FIG. 4 is an illustration of a second embodiment of the display of local results.

In another embodiment, rather than display a new screen as depicted in FIG. 3, the individual results can be shown inline with the indications. Referring to FIG. 4, each indication 18, 19 can be provided with a control element, such as a triangular button 23, that can be activated by the user. When activated, the results appear in the form of a drop-down menu below the indication. In the example of FIG. 4, the button 23 for the Maps results has been activated. In response thereto, the individual results 25 for the map application are displayed below the indicator 24. Although only two such results are shown in the example of FIG. 4 for illustrative purposes, it will be appreciated that any suitable number of the local results can be displayed, as space permits.

Figure 5:
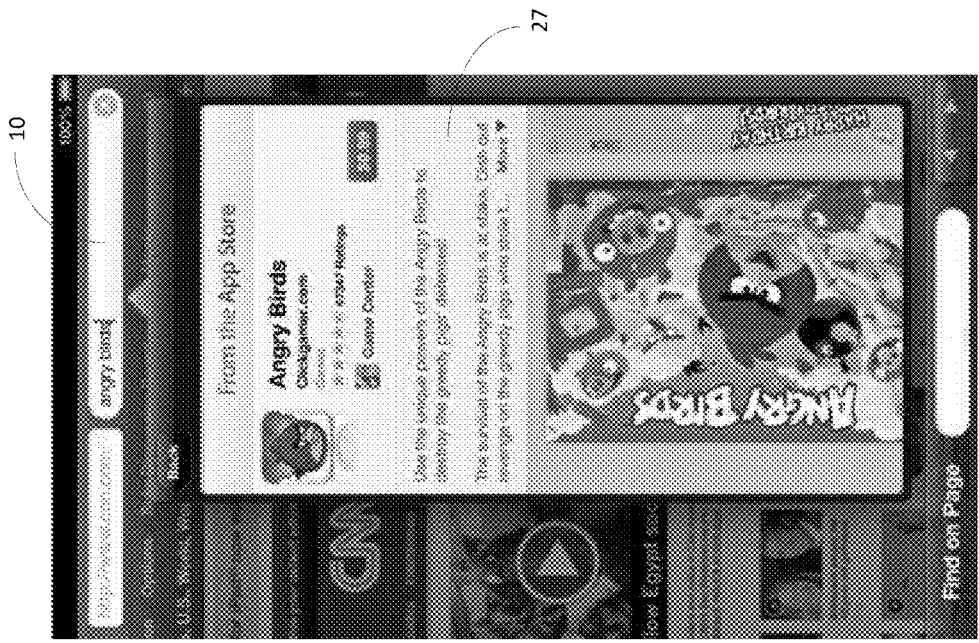
FIG. 5 is an illustration of another embodiment of the display of a local result.

In yet another embodiment, for localized results that are associated with an online store, the user interface can transition to show the store display of the corresponding product. For instance, FIG. 5 illustrates an example in which the user has entered the name of an applet in a search query field 10 for a website. In response to receipt of a localized result that matches the query, the user interface displays a store screen or window 27 that corresponds to that applet. This window can be the same window that would be displayed if the user had launched an applet for the online store and initiated a search from within that applet. Among other things, the window provides descriptive information about the product, and offers the user the opportunity to directly purchase it from the store.

Returning to FIG. 4, the local results 25 can be displayed adjacent the suggestions 12 provided by the search engine. To enable the user to distinguish local results from search engine suggestions, in one embodiment an associated icon can be displayed with each result. In the example of FIG. 4, in which the results 25 for a map application are presented, an icon 29 is displayed adjacent each result. In this case, the icon is one that is associated with the map application. The icon could be static, or can be an updating SVG icon that depicts the user's current location. If the displayed results comprise applets, the icons could be the respective thumbnail or icon for each applet. In the case of music, the icon might be a thumbnail of an album cover, or the like.

Figure 6:
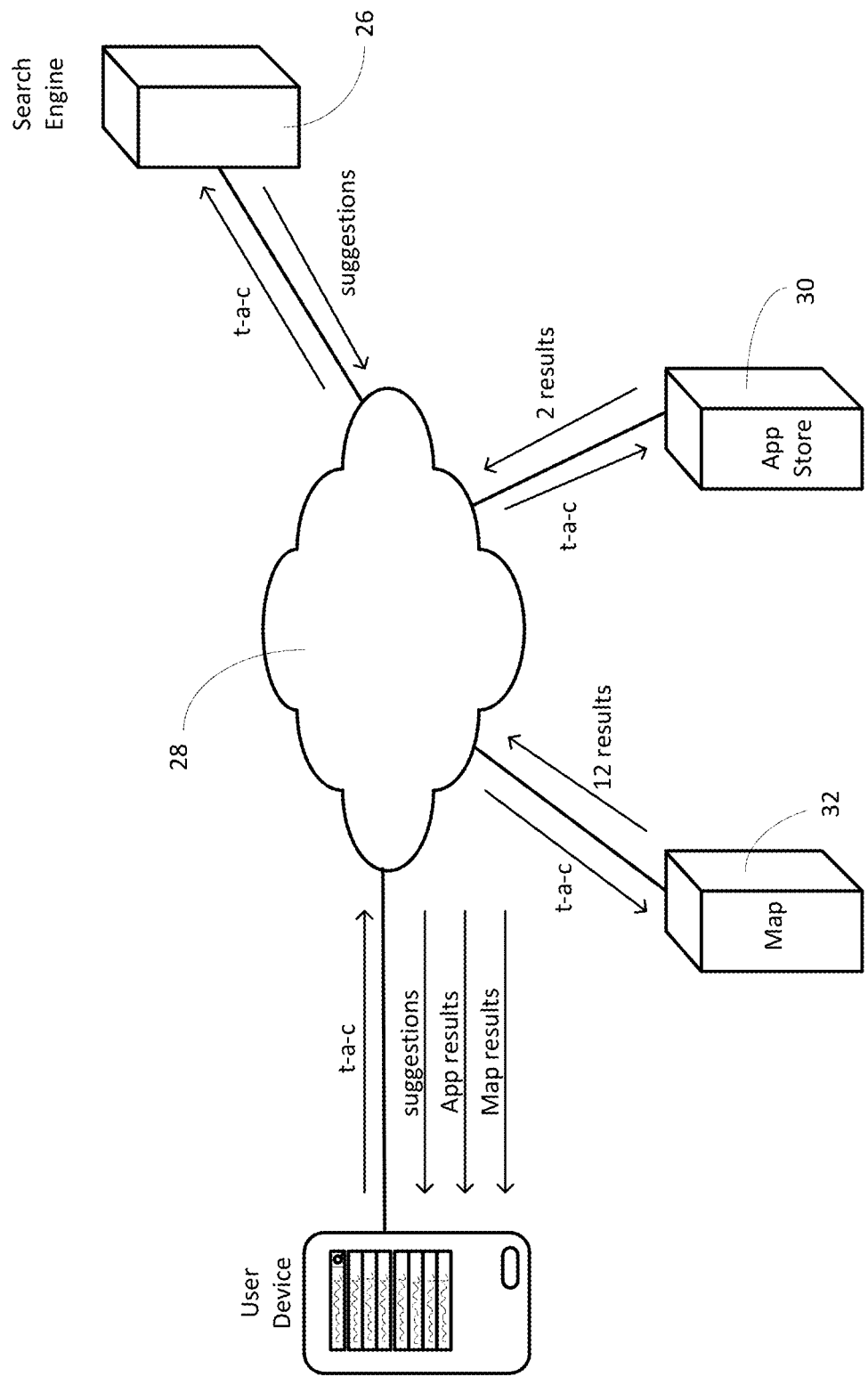
FIG. 6 is a schematic diagram of one embodiment of a network for implementing the features of the user interface.

The localized results that are displayed in the menu 16 are based upon one or more specific domains associated with the user interface. In the examples of FIGS. 2 and 4, two domains are represented, namely an online applet store and a map applet. FIG. 6 illustrates an embodiment of a network structure to provide this functionality. After the user has accessed the server for a search engine 26, and begins to enter characters for a search query, the characters are transmitted to the search engine site via a network 28, such as the Internet.

In addition, those characters are sent to one or more servers for domains associated with respective types of localized information. In the example of FIG. 2, the characters are sent to a server that is associated with an online applet store 30, and a server associated with a map applet 32. Location information is bundled with the character data that is sent to the domain servers 30 and 32. If the user device has geospatial capabilities, such as a GPS receiver, the user's current location can be sent. Alternatively, the user might specify a particular location of interest to transmit with the character data.

In response to receipt of the individual search query characters, the search engine 26 may return suggestions 12 for completing the search query, based upon popular search queries, and/or some other heuristic. The browser can display those suggestions below the query entry field, as depicted in FIG. 2. The search engine may return the suggestions as soon as the first character is received, or may wait until a predetermined minimum number of characters have been received, e.g. two or three characters. Such a delay may be controlled by the server to manage its load. Alternatively, or in addition, the user's device may delay the initial transmission until a minimum number of characters have been entered, e.g., to limit radio usage in the case of a low battery charge state.

In the same manner, the online applet store server 30 and the map applet server 32 use the received characters to identify information items within their respective domains that match the received characters. Thus, for example, in response to receipt of the characters "t-a-c," the online applet store server 30 searches for applets available through the store whose names contain that sequence of characters. In one implementation, the server can use heuristics to identify the most likely applets of interest, e.g., which applets are most popular at that time. The server may also search the descriptions of applets to determine if the sequence of characters is present in the descriptions, regardless of whether they appear in the name of an applet. In a similar manner, the map applet server 32 uses the received location information to examine the names of locations within a predefined distance from the user's current or specified location, to determine whether they contain the received sequence of characters. As matches are found, the servers return results to the user's device, for concurrent display as the search query is being entered. As additional characters are received, the match results are filtered in accordance with those characters, and the display is updated.

The results that are displayed in the localized information menu 16 are often likely to be more relevant to the user's area of inquiry than those obtained through a more widespread search conducted via an online search engine. Since the localized results are displayed as the user is entering the search query, if a result of particular interest to the user appears in the menu, the user can immediately access that item of information, without having to complete the search query, and/or submit it to the search engine.

Initially, the user interface might be configured to communicate with a number of different servers that are associated with respective domains. The results from each domain can appear in summary form as a separate entry in the localized information menu, as with the two sets of results shown in the example of FIG. 2. If the user is not interested in the category of information provided by a particular domain, the entry associated with that domain can be removed from the menu, e.g., via a horizontal sweeping motion through the menu item, or similar such action. When an entry is removed, the user's device can remove the associated server's address from its communication settings, and thereby cease to communicate with the server for that domain in all future searches.

Geospatial services can be employed to filter the displayed results. For example, if the user is searching for transit information, applets can be chosen based on their relevance to the user's current location. Thus, if the user is located in New York City, applets pertaining to the New York Subway system might be identified. On the other hand, if the user is located in Paris, France, applets pertaining to the Paris Metro would be identified.

Figure 7:
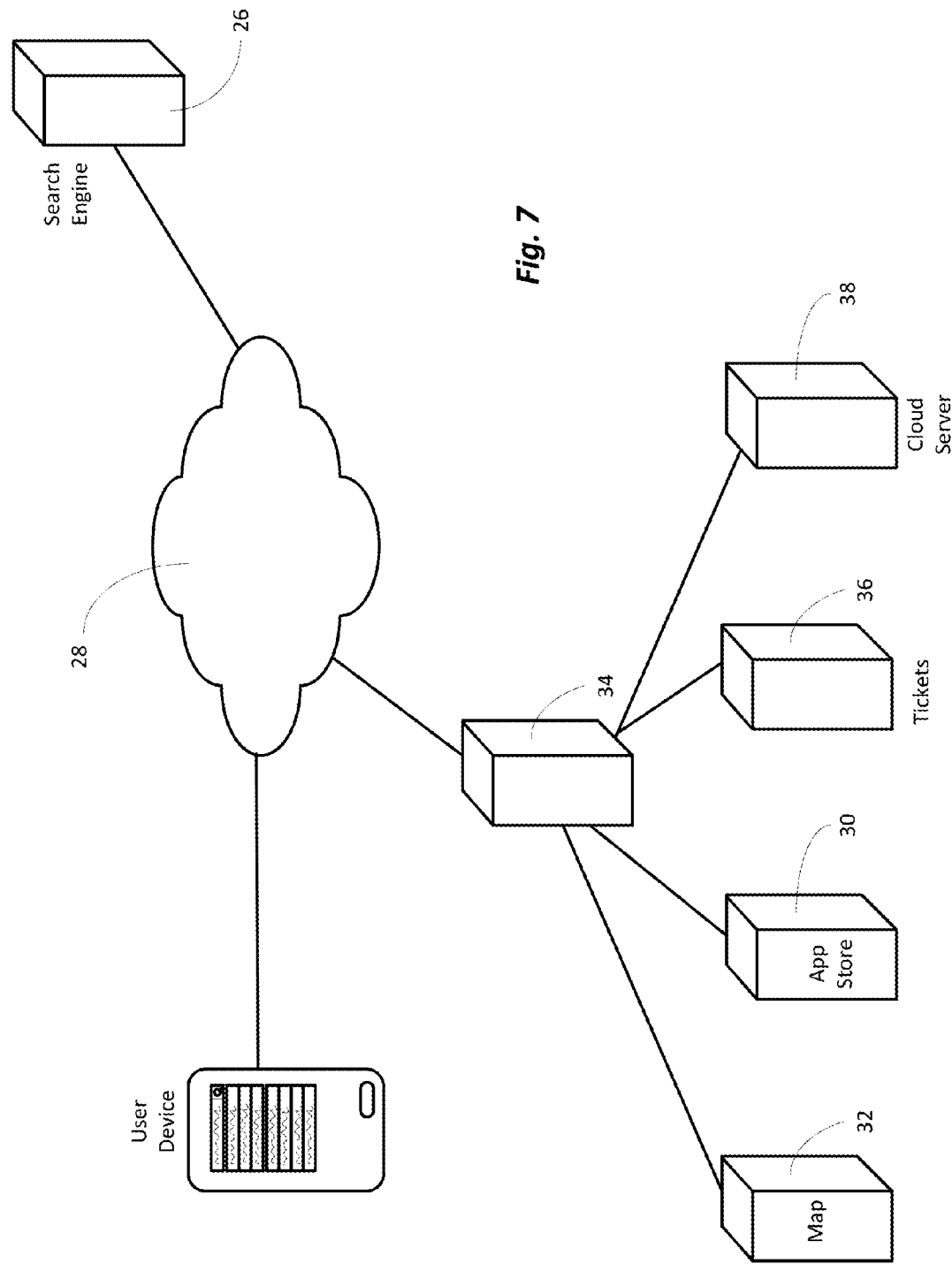
FIG. 7 is a schematic diagram of an alternate embodiment of a network for implementing the user interface.

In the example of FIG. 6, the user's device communicates with two localized information servers, which are respectively associated with two particular domains, namely the online applet store and the map applet. An alternative embodiment is illustrated in the schematic network diagram of FIG. 7. In this example, in addition to communicating with the website for the search engine, the user's device sends the search query characters and location information to a central server 34 that is associated with the user interface. This server might be affiliated with, for example, the service provider for the user's device, the manufacturer of the user's device, or any other suitable entity having an online presence and access to the domains of interest to the user. This central server, in turn, communicates with other servers that are associated with the specific domains of interest. In the example of FIG. 7, the central server 34 communicates with domain servers for an online applet store 30, a map applet 32, and a ticket vendor 36, among others. Other suitable domains that are not shown in FIG. 7 might pertain to music, movies, television shows, and other forms of entertainment, for example.

The user can register with the central server, and identify domains that are of interest for localized information. Moreover, the user may have the ability to register different sets of domains for different computing devices. For example, the online applet store domain may not be of interest with respect to a desktop computer, if the applets are not designed to be used with the operating system of the desktop computer. Similarly, the map applet may not be functional on the desktop computer. In that case, the user may register the desktop computer to receive only localized information that is available from the ticket vendor server 36. Conversely, if the user also has a mobile computing device, such as a smart phone and/or a tablet computer, the user might register those devices to receive information from all three of the localized information servers. In this situation, when communicating with the central server during the entry of the search query, a device identifier, along with the search query characters and location information, is transmitted to the central server. Based upon the device identifier, the central server determines which of the localized information servers should receive the search query characters and location information.

In addition to information associated with third parties, such as available applets, map locations and other digital merchandise, information that is personal to the user can be displayed in the localized information menu 16. For example, the browser itself may be aware of what information is stored on the user's device, and display an indication of such in the localized information menu 16. In addition, the user may have a cloud computing account, in which documents, purchased applets, and other information are stored on a server 38 that is accessible via a plurality of different devices. The central server 34 can communicate with the cloud computing server 38 to locate items stored in the user's account that are relevant to the search query, and display an indication of them in the localized information menu 16. If the user taps, or clicks, upon the indicator in the menu, the listing of the matching items can be displayed. If the user selects one of those items, the cloud computing server 38 can indicate whether that item is already locally stored on the user's device. If it is not, the user can be provided with the opportunity to download that document or other item of information to the device currently being used.

From the foregoing, it can be seen that the disclosed user interface provides an enhanced user experience when conducting a search for information of interest. In addition to the results that may be available from a more general, global interface, such as an Internet search engine, the user is provided with information located at a particular domain that may not be accessible via the search engine. Moreover, even if the information is accessible by the search engine, the heuristics used by the search engine to prioritize, or rank, the returned results may not match the particular interests of the user. Consequently, the time required to locate the items of interest among the search engine results may be prolonged. By providing information that is managed by domains which more closely match the user's interest, the user is able to identify and retrieve relevant results more quickly. Moreover, these relevant results can be identified and retrieved even before the search query is completed, thereby obviating the need to submit the query to the search engine.

Figure 8:
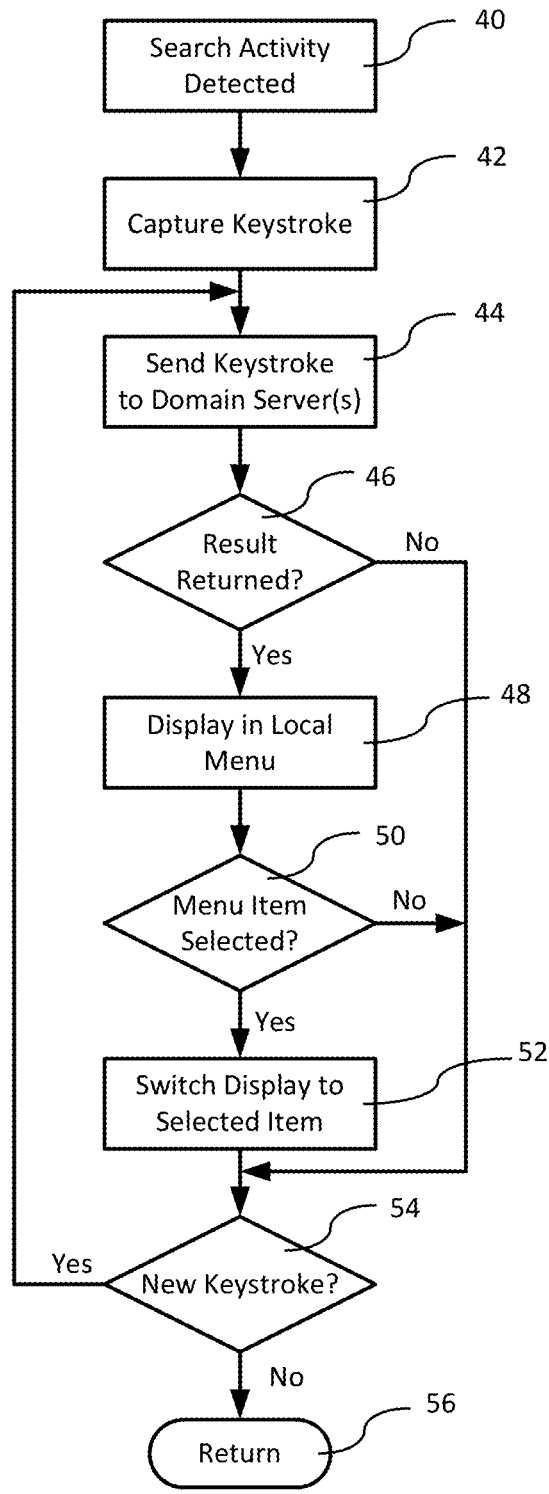
FIG. 8 is a flowchart of a sequence of steps to implement the functionality of the user interface.

Computer program instructions for implementing the features of the user interface may be incorporated within a browser. FIG. 8 is a flowchart illustrating one example of an algorithm for the functionality of the user interface. This functionality is initiated when the user begins to enter a search. At step 40, the browser detects that the user is entering a search to be conducted. For instance, when a user taps, or clicks upon, the search entry field 10 in a web page associated with an online search engine, the browser typically displays a cursor symbol, and may cause it to blink to indicate that text can be entered. This activity may also cause the browser to execute the algorithm of FIG. 8.

At step 42, a keystroke that is entered in the search field 10 is captured, and sent to each domain server that has been designated as being of interest, at step 44. As noted previously, the browser may be initially loaded with a set of one or more default domain servers, or the user may have registered his or her device to receive information from domain servers of interest. Over time, the user may change those designations. In step 44, the character associated with each keystroke is sent to each of the domain servers that are stored in the browser's communication settings as being of interest to the user. The keystroke characters can also be sent concurrently to the search engine during step 44.

At step 46, the browser determines if any results are returned from the designated domain servers. These results could be in the form of an actual text string that is to be displayed in the menu, e.g. "12 results on Maps". Alternatively, they could be in the form of an information identifier, such as an applet ID, which the user device can use to look up the specific item of information. If any results are returned, the localized information menu is displayed at step 48 with an indication of those results. In the example of FIG. 2, each line of the menu displays a summary of the results received from a respective domain server. These summaries can be generated by the browser, based on the results obtained from the domain servers. In an alternative embodiment, the actual results could be displayed in the menu as separate items, e.g. the names of the two identified applets from the online applet store and the locations of the twelve identified restaurants.

At step 50, a determination is made whether the user has selected, e.g., tapped or clicked upon, an item in the localized information menu. If so, the browser displays the information relevant to the selected item at step 52. Thus, for the embodiment shown in FIG. 3, if the user taps upon the item pertaining to the online applet store, the browser displays a new sheet containing the names of the two applets that were returned from the domain server associated with the online store. If the user taps upon one of the displayed names, the browser can launch an online store applet, and send the name of the selected applet to the store, so that information about that selected applet is provided by the store for display on the user's device. Alternatively, in response to selection of menu entry 18 in the example of FIG. 2, the browser can directly launch the online store applet, where descriptions of the two applets are presented.

In alternative embodiments, at step 52, the browser might display an inline listing of the individual results, as shown in the example of FIG. 4, or transition to a display that is specific to the type of result, as in the example of FIG. 5.

At step 54, the browser determines if another keystroke has been entered by the user. If so, it returns to step 44 and repeats the procedure described above. If not, the browser returns to its standard process at step 56, e.g. display the suggestions provided by the search engine, or detect activation of the "Search" button 14 and send the query to the search engine.

It will be appreciated by those of ordinary skill in the art that the disclosed user interface can be embodied in other specific forms without departing from the spirit or essential characteristics thereof. For example, the user interface was described in conjunction with conducting a search of the Internet using a known search engine, e.g., via a browser. However, the user interface is not limited to use with this type of search. Rather, it can be employed in the context of any type of search, where it may be desirable to display relevant results in addition to those provided by the search engine being employed for the search. Thus, for example, it can be employed in conjunction with a local search tool that enables users to find content on their devices and/or in a local network, as well as with search tools provided on web pages of retailers, information services, etc.

The presently disclosed embodiments are therefore considered in all respects to be illustrative and not restrictive. The scope of the invention is indicated by the appended claims, rather than the foregoing description, and all changes that come within the meaning and range of equivalence thereof are intended to be embraced therein.

What is claimed is:

1. A method comprising:
   at an electronic device with a display and a battery:
   receiving a first portion of text for a search query;
   in response to receiving the first portion of the text:
     displaying, on the display, a first set of localized results retrieved based on the first portion of text without displaying remote search results from a remote search engine;
   while displaying the first set of localized results, receiving a second portion of text for the search query;
   in response to receiving the second portion of the text:
     in accordance with a determination that the first portion of text and the second portion of text together include more than a predetermined number of characters, wherein the predetermined number of characters is greater than 1 and is based on a low battery charge state of the battery, concurrently displaying, on the display, a plurality of results that include:
       a set of results received from a remote search engine; and
       a second set of localized results associated with one or more applications retrieved based on the first portion of the text and the second portion of the text.

2. The method of claim 1, wherein an application of the one or more applications is a map applet, and in response to selection of a respective result in the first set of localized results, displaying a map showing a location that corresponds to the respective result.

3. The method of claim 1, further comprising:
receiving a third portion of the text; and
updating the displayed plurality of results in response to receiving the third portion of the text.

4. The method of claim 1, further comprising forwarding location information to the remote search engine with the received text.

5. The method of claim 1, further comprising filtering the plurality of results in accordance with location information.

6. The method of claim 1, further comprising:
detecting selection of a respective result in the plurality of results; and
in response to the detected selection:
in accordance with a determination that the result is a result associated with a first application, launching the first application; and
in accordance with a determination that the result is a result associated with a second application, launching the second application.

7. The method of claim 1, wherein the plurality of results are displayed in-line with indications that the one or more applications are installed on the electronic device.

8. The method of claim 1, wherein the set of results received from the remote search engine includes a website.

9. The method of claim 1, wherein the set of results received from the remote search engine includes a suggested search term.

10. The method of claim 1, wherein the second set of localized results is obtained independently of the set of results received from the remote search engine.

11. The method of claim 1, wherein the remote search engine is an Internet search engine.

12. The method of claim 1, further comprising:
in accordance with a determination that the first portion of text and the second portion of text together include less than the predetermined number of characters, displaying a third set of localized results associated with one or more applications on the device retrieved based on the first portion of text and the second portion of text without displaying remote search results from the remote search engine.

13. The method of claim 1, wherein the plurality of results further include located resources associated with a domain, the domain being separate from the remote search engine; the method further comprising:
detecting a user input related to the located resources; and
responsive to the user input, removing the domain from a set of domains of interest.

14. The method of claim 1, further comprising:
transmitting each character of the text to the remote search engine as the text is received; and
receiving a separate set of results from the remote search engine in response to each transmitted character of the text.

15. The method of claim 1, wherein:
the displaying of the first set of localized results comprises displaying a summary of the set of localized results; and
further comprising:
detecting selection of the summary; and
in response to the detection, displaying a listing of the set of localized results.

16. A system comprising:
a user device having a display and a battery;
one or more processors configured to perform operations comprising:
providing an interface that:
receives text for a search query;
communicates with at least one search engine server via a network;
in response to the receipt of a first portion of the text for the search query:
displays a first set of localized results retrieved based on the first portion of text without displaying remote search results from the search engine server;
while displaying the first set of localized results, receives a second portion of text for the search query; and
in response to receiving the second portion of the text:
in accordance with a determination that the first portion of text and the second portion of text together include more than a predetermined number of characters, wherein the predetermined number of characters is greater than 1 and is based on a low battery state of the battery, concurrently displays a plurality of results that include:
a set of results received from the search engine server; and
a second set of localized results associated with one or more applications on the device retrieved based on the first portion of the text and the second portion of the text.

17. The system of claim 16, wherein the interface separately transmits each character of the text to the search engine server as the text is received, and a set of results is received from the search engine server in response to each transmitted character of the text.

18. The system of claim 16, wherein the set of localized results is filtered in accordance with location information.

19. The system of claim 16, wherein:
the display of the first set of localized results comprises a display of a summary of the set of localized results; and
the interface is further configured to:
detect selection of the summary; and
in response to the detection, display a listing of the first set of localized results.

20. The system of claim 16, wherein the interface further:
in accordance with a determination that the first portion of text and the second portion of text together include less than the predetermined number of characters, displays a third set of localized results associated with one or more applications on the device retrieved based on the first portion of text and the second portion of text without displaying remote search results from the search engine server.

21. The system of claim 16, wherein an application of the one or more applications is a map applet, and in response to selection of a respective result in the first set of localized results, displaying a map showing a location that corresponds to the respective result.

22. The system of claim 16, wherein the operations further comprise:
receiving a third portion of the text; and
updating the displayed plurality of results in response to receiving the third portion of the text.

23. The system of claim 16, wherein the operations further comprise:
forwarding location information to the search engine server with the received text.

24. The system of claim 16, wherein the operations further comprise:

detecting selection of a respective result in the plurality of results; and in response to the detected selection:
in accordance with a determination that the result is a result associated with a first application, launching the first application; and
in accordance with a determination that the result is a result associated with a second application, launching the second application.

25. The system of claim 16, wherein the plurality of results are displayed in-line with indications that the one or more applications are installed on the user device.

26. The system of claim 16, wherein the set of results received from the search engine server includes a website.

27. The system of claim 16, wherein the set of results received from the search engine server includes a suggested search term.

28. The system of claim 16, wherein the second set of localized results are obtained independently of the set of results received from the search engine server.

29. The system of claim 16, wherein the search engine server is an Internet search engine server.

30. The system of claim 16, wherein:
the plurality of results further include located resources associated with a domain, the domain being separate from the search engine server; and
the operations further comprise:
detecting a user input related to the located resources; and
responsive to the user input, removing the domain from a set of domains of interest.

31. A non-transitory computer-readable storage medium having stored thereon program instructions that, when executed, cause a processor of a device to perform operations comprising:
displaying an interface;
receiving, via the interface, user entry of a first portion of text for a search query;
in response to receiving the first portion of the text:
displaying a first set of localized results retrieved based on the first portion of text without displaying remote search results from a remote search engine;
while displaying the first set of localized results, receiving a second portion of text for the search query;
in response to receiving the second portion of the text:
in accordance with a determination that the first portion of text and the second portion of text together include more than a predetermined number of characters, wherein the predetermined number of characters is greater than 1 and is based on a low battery state of a battery, concurrently display a plurality of results that include:
a set of results received from an Internet search engine; and
a second set of localized results associated with one or more applications on the device retrieved based on the first portion of the text and the second portion of the text.

32. The non-transitory computer-readable storage medium of claim 31, wherein:
the display of the first set of localized results comprises a summary of the set of localized results; and
the operations further comprise:
detecting selection of the summary; and
in response to the detection, displaying a listing of the set of localized results.

33. The non-transitory computer-readable medium of claim 31, wherein an application of the one or more applications is a map applet, and in response to selection of a respective result in the first set of localized results, displaying a map showing a location that corresponds to the respective result.

34. The non-transitory computer-readable medium of claim 31, wherein the operations further comprise:
receiving a third portion of the text; and
updating the displayed plurality of results in response to receiving the third portion of the text.

35. The non-transitory computer-readable medium of claim 31, wherein the operations further comprise:
forwarding location information to the remote search engine with the received text.

36. The non-transitory computer-readable medium of claim 31, wherein the operations further comprise:
filtering the plurality of results in accordance with location information.

37. The non-transitory computer-readable medium of claim 31, wherein the operations further comprise:
detecting selection of a respective result in the plurality of results; and
in response to the detected selection:
in accordance with a determination that the result is a result associated with a first application, launching the first application; and
in accordance with a determination that the result is a result associated with a second application, launching the second application.

38. The non-transitory computer-readable medium of claim 31, wherein the plurality of results are displayed in-line with indications that the one or more applications are installed on the device.

39. The non-transitory computer-readable medium of claim 31, wherein the set of results received from the remote search engine includes a website.

40. The non-transitory computer-readable medium of claim 31, wherein the set of results received from the remote search engine includes a suggested search term.

41. The non-transitory computer-readable medium of claim 31, wherein the set of localized results are obtained independently of the set of results received from the remote search engine.

42. The non-transitory computer-readable medium of claim 31, wherein the operations further comprise:
in accordance with a determination that the first portion of text and the second portion of text together include less than the predetermined number of characters, displaying a set of localized results associated with one or more applications on the device retrieved based on the first portion of text and the second portion of text without displaying remote search results from the remote search engine.

43. The non-transitory computer-readable medium of claim 31, wherein:
the plurality of results further include located resources associated with a domain, the domain being separate from the remote search engine; and
the operations further comprise:
detecting a user input related to the located resources; and
responsive to the user input, removing the domain from a set of domains of interest.

44. The non-transitory computer-readable medium of claim 31, wherein the operations further comprise:

transmitting each character of the text to the remote search engine as the text is received; and receiving a set of results from the remote search engine in response to each transmitted character of the text.

* * * * *